Figure 1:
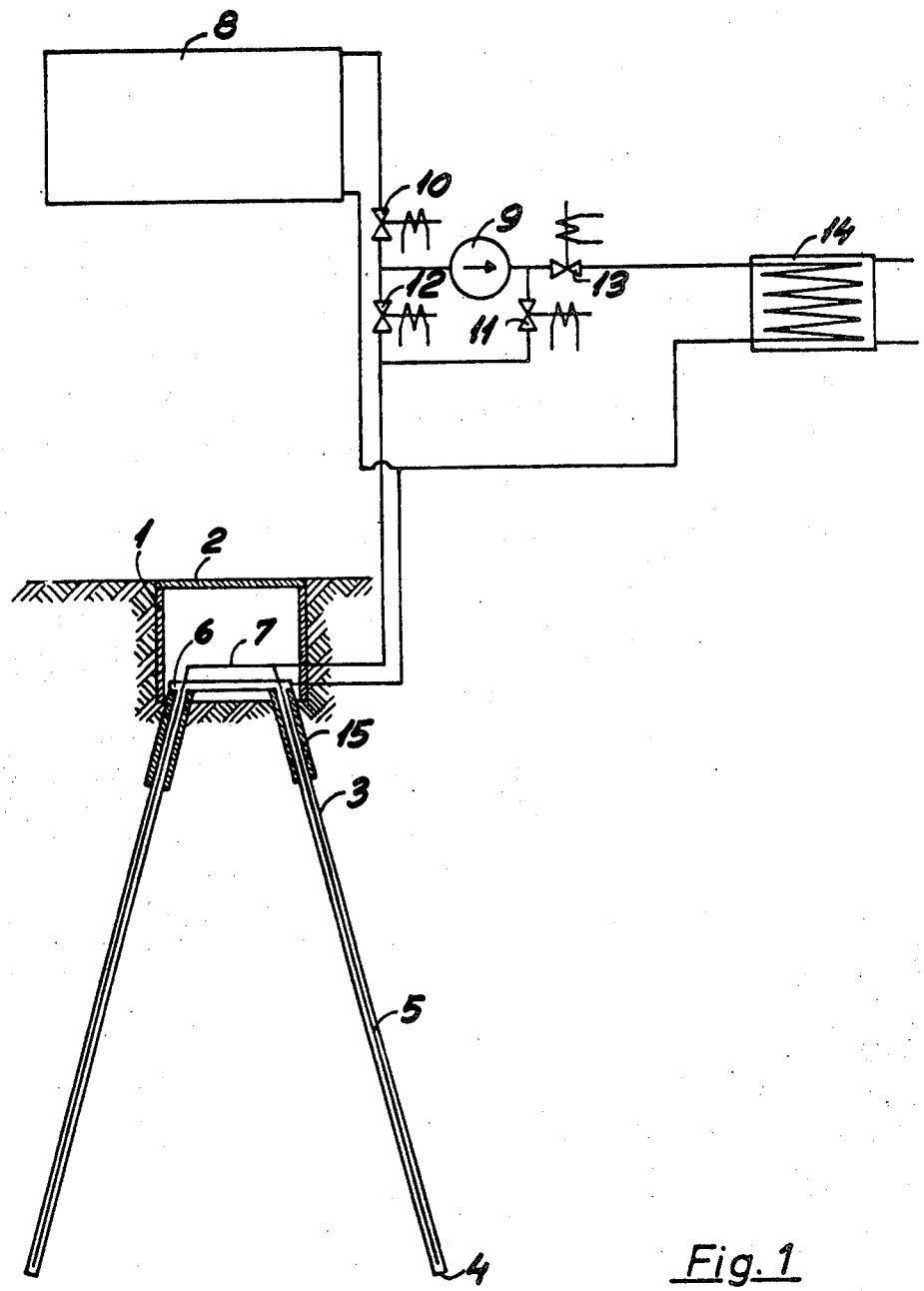

United States Patent [19]

Knudsen

[11] 4,434,785
[45] Mar. 6, 1984

[54] HEAT ACCUMULATOR

[76] Inventor: Niels K. Knudsen, Rolighedsvej 13, DK-8722 Hedensted, Denmark

[21] Appl. No.: 431,725

[22] Filed: Sep. 27, 1982

Related U.S. Application Data

[63] Continuation of Ser. No. 261,207, May 6, 1981, abandoned.

[30] Foreign Application Priority Data

Sep. 6, 1979 [DK] Denmark ............................ 3720/79

[51] Int. Cl.³ ........................ F24H 7/00; F28D 00/00
[52] U.S. Cl. .................................... 126/400; 165/45; 126/436
[58] Field of Search ............... 126/400, 430, 435, 436; 165/45, 18

[56] References Cited

U.S. PATENT DOCUMENTS

| | | | |
|---|---|---|---|
| 2,761,286 | 9/1956 | Billue et al. | 165/45 |
| 3,957,108 | 5/1976 | Van Huisen | 165/45 |
| 3,965,972 | 6/1976 | Petersen | 165/45 |
| 4,044,830 | 8/1977 | Van Huisen | 165/45 |
| 4,052,857 | 10/1977 | Altschuler | 165/45 |
| 4,054,176 | 10/1977 | Van Huisen | 165/45 |
| 4,062,489 | 12/1977 | Henderson | 165/18 |
| 4,267,881 | 5/1981 | Byerly | 126/436 |
| 4,286,651 | 9/1981 | Steiger | 165/45 |
| 4,301,965 | 11/1981 | Ritter | 126/427 |

FOREIGN PATENT DOCUMENTS

| | | | |
|---|---|---|---|
| 3018337 | 11/1980 | Fed. Rep. of Germany | 165/45 |
| 2419470 | 11/1979 | France | 165/45 |
| 2470938 | 6/1981 | France | 165/45 |
| 2495741 | 6/1982 | France | 165/45 |
| WO81/00754 | 3/1981 | PCT Int'l Appl. | 126/436 |

*Primary Examiner*—Samuel Scott
*Assistant Examiner*—G. Anderson
*Attorney, Agent, or Firm*—Lewis H. Eslinger

[57] ABSTRACT

An underground heat accumulator of the low temperature type for storing solar energy from a solar collector (8) by means of a plurality of buried double pipes with an outer pipe (3) and an inner pipe (5) has said pipes conically disposed, extending from a central well (1) with a cover (2) near the surface of the ground.

The conical position of the pipes provides a very small area in the surface of the ground while embracing a large volume of earth in the depth.

The loss of heat at the surface of the ground is therefore limited and yet the accumulation capability is adequate.

2 Claims, 3 Drawing Figures

HEAT ACCUMULATOR

This is a continuation of application Ser. No. 06/261,207, filed May 6, 1981 now abandoned.

The invention relates to an underground heat accumulator of the low temperature type, with buried vertically disposed double pipes for storing solar energy for residential heating.

Accumulators for storing solar energy have either an insulated water tank or direct accumulation in the ground about buried pipes which may be covered by a heat insulating material at the surface of the ground. In systems where solar energy is stored in an underground heat accumulator of the low temperature type with vertically disposed double pipes, the solar energy is fed from the solar collector to the bottom of the outer pipe through the inner pipe, and the heat stored in the heat accumulator is given off from the bottom of the outer pipe through the inner pipe to the heat system through the evaporator of a heat pump. The pipes may be inclined from a circular area of larger diameter than the storage area and be covered by an insulating layer which also insulates the connections to the pipes.

Such methods require much and expensive digging in order for pipes and insulation or other defining coating to be fitted, and the costs involved prevent solar energy from being used for ordinary residential heating. The accumulation capability and efficiency often turn out to be much too poor at increasing temperatures in accumulators having a too limited accumulation volume so that an increase in the mean temperature of the solar collector results in a significantly poorer capture of heat. Therefore the area of the solar collector must be very large and correspondingly expensive.

The heat accumulator of the invention is characterized in that the pipes are vertically, conically inclined with a common geometric vertex near the surface of the ground.

The very small area near the surface of the ground minimizes the loss of heat, and at the same time the inclined position of the pipes embraces a very large quantity of earth as accumulation volume.

The conical mounting of the pipes allows rational operation when installing the accumulator and provides a very great accumulation capability, optimizing the efficiency of the solar collector and the associated heat pump. Consequently, it is therefore economically and technically possible to use solar energy in practice for ordinary residential heating.

The central well of the heat accumulator may be reduced according to the invention because the upper portion of the outer pipe below the surface of the ground is formed with a tubular heat insulating jacket at the bottom of the central well.

Calculations show a correlation between diffusion of heat in the ground and the time spent, whereas the temperature does not affect the extent of diffusion but only the amount of heat. Diffusion to the surface of the ground may thus be prevented by digging a central well so deep and wide that the pipes only extend into the ground at the depth calculated, but much work and large costs can be saved by using a much smaller central well and instead insulating the pipes in the ground to the desired depth.

The loss of heat from the accumulator to the surface of the ground must be minimized to ensure efficiency and to prevent adverse variations in temperature in the surface of the ground and consequent disturbance of nature's own temperature.

According to the invention the capacity of the heat accumulator may advantageously be dimensioned by adapting the physical size of the accumulator so as to provide equilibrium, on an annual basis, between the accumulation capability and consumption of heat by determination of the number and length of the double pipes from one or more central wells.

The original temperature of the earth provides an additional energy store which can be used following a period of few sunny days. In the following year the efficiency of the solar collector will increase because of the lower flow temperature from the accumulator.

The desired consumption of heat and the required solar collector area adapted to the accumulator in such a manner that the temperature of the double pipes at the top near the bottom of the central well does not differ much from the original temperature of the earth in long periods, but only at the end of the accumulation period in the autumn may occur a slight increase in temperature. During subsequent consumption the top of the double pipes rapidly gives off its heat to thereby shorten the period of increase in temperature. The duration of the period is the time to be used when determining the length of the heat insulating jacket from the bottom of the central well.

A heat accumulator of the invention is shown in the drawing in which

Figure 2:
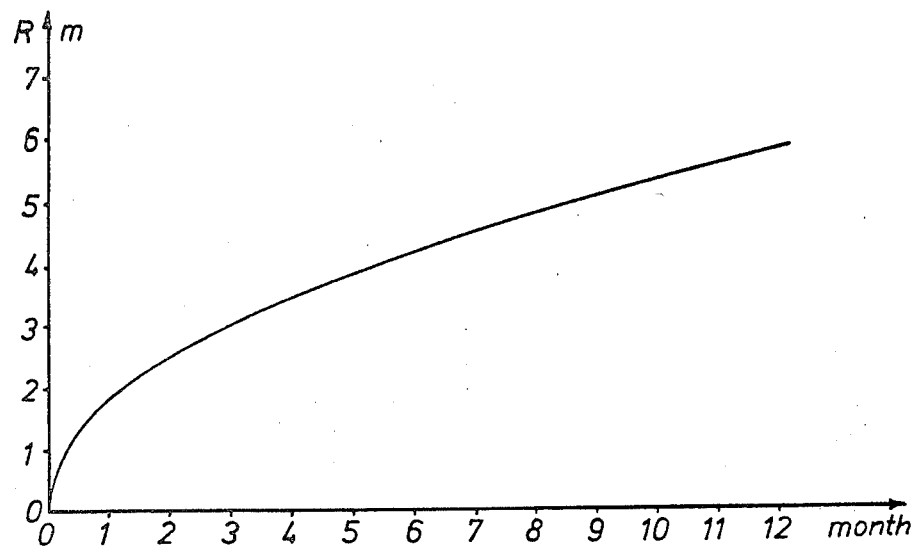
Figure 3:
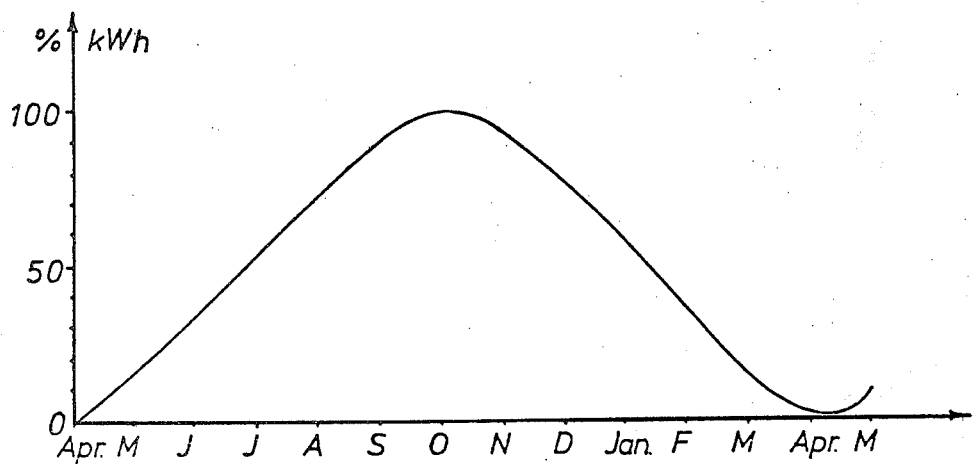

FIG. 1 is a diagrammatic, vertical section of the accumulator with associated pipe connections in diagram, FIG. 2 shows a curve illustrating the diffusion of the accumulated heat in the ground, and FIG. 3 shows a curve for a period from April to April with accumulation and subsequent consumption in per cent kWh of the heat requirement.

The heat accumulator comprises a central well 1 with a cover 2 at the surface of the ground. From the bottom of the central well are dug an outer pipe 3 with a bottom 4, and an inner pipe 5 extending down to the bottom 4 of the outer pipe 3. For sufficient energy to be stored, several such double pipes must be fitted which are connected in parallel from a distribution pipe 6 to the outer pipes 3 and another connection pipe 7 to the inner pipe 5. The distribution pipes 6 and 7 are connected to a solar collector 8 from which heat is transported by an antifreeze liquid by means of a pump 9 having a valve 10 and 11 opened for flow to the pipe 7 which carries heat to the inner pipes 5 and the bottom 4 of the outer pipes 3. On its way up through the pipes 3 heat is given off to the surrounding earth which according to calculations can store a considerable amount of heat which is very slowly passed out to the circumjacent earth, for which reason the loss of heat to the surroundings is of minimum importance.

When heat is received from the accumulator the valves 10 and 11 are closed, while a valve 12 and 13 opens and the pump 9 passes the heat to the evaporator 14 of a heat pump, the heat being transported from the outer pipe 3 through the inner pipe 5 to the connecting pipe 7 and through the valve 12.

To save digging to the size of the central well 1, a heat insulating jacket 15 is fitted on the upper portion of the outer pipe 3.

Digging for the central well 1 can also be varied by digging the double pipes correspondingly deeper into the ground, but costs make it advantageous to insulate the upper portion of the outer pipe 3 instead.

FIG. 2 shows, by means of a curve, the diffusion of the heat from a heat carrying pipe in the ground. The time in months is plotted on the horizontal axis in the diagram, and a radial diffusion in meters is plotted on the vertical axis. The curve is calculated according to an empiric formula:

$$H = 10.42 \, D^2 (\ln D - \ln d)$$

H being the time in hours and D the diameter in meters of diffusion and d the pipe diameter in meters, diffusion being plotted in the diagram as radius $R = \frac{1}{2}D$. It appears from the formula that the temperature is not included in the calculation of the extent of diffusion.

FIG. 3 shows a curve of the accumulation in the period from April to October and subsequent consumption terminated in April the year after, the period being plotted as a horizontal axis and the corresponding accumulated amount of heat kWh in percent as a vertical axis. The curve shows that it is possible to accumulate the portion of the heat amount which the heat pump requires for residential heating in a heating period, corresponding to approximately 75% of the entire heat amount, depending upon the type of heat pump chosen.

Thus, by using the shown heat accumulator in connection with a solar collector in a heat pump system, the power factor of the heat pump is significantly improved, and at the same time the risk of perma frost in the earth around the pipes is avoided.

I claim:

1. An underground heat accumulator of the low temperature type for storing solar energy from a solar collector, comprising a plurality of buried double pipe assemblies, each including an inner pipe and an outer pipe connected in parallel and each extending at an upper end thereof from a double, annular pipe connection at the bottom of a central well having a cover, energy from said collector being passed through the inner pipe to the bottom of each double pipe assembly and from there to the outer pipe thereof, the heat stored in the heat accumulator being given off from the bottom of each outer pipe through the respective inner pipe and supplied to an evaporator of a heat pump by means of a pump, wherein the improvement comprises that at least the upper ends of the pipes are vertically, conically inclined with a common geometric vortex near the surface of the ground and that each outer pipe is formed with a tubular insulating jacket extending from the bottom of the central well to a depth where soil is substantially unaffected by annual thermal fluctuations.

2. An underground heat accumulator according to claim 1, wherein the physical size of the accumulator is adapted to provide equilibrium, on an annual basis, between accumulation capability and heat consumption by determination of the number and length of the double pipe assemblies from one or more central wells.

* * * * *